United States Patent Office 3,213,037
Patented Oct. 19, 1965

3,213,037
CLAY CATALYST AND METHOD OF
PREPARATION THEREOF
John A. Hodgkiss, Old Bridge, N.J., assignor to General
Aniline & Film Corporation, New York, N.Y., a corporation of Delaware
No Drawing. Filed Dec. 29, 1961, Ser. No. 163,026
7 Claims. (Cl. 252—450)

This invention relates to a new type of clay catalyst having unique activity in the alkylation of phenolic compounds and in the conversion of hydrocarbon oils, and particularly to the process of preparing the same.

It is well known that clays of the bentonite type are first activated by treatment with mineral acids such as hydrochloric, sulfuric, etc., under one or more steps of varying conditions of temperature, etc., to produce bleaching earths and active catalyst materials for cracking high boiling liquid hydrocarbons and in the alkylation of phenolic compounds. In substantially all of the known activation processes, i.e., acid treatment, the mineral acid is added to an aqueous suspension of clay or diluted mineral acid added directly to the raw or dried clay and the bleaching conducted at various temperatures.

Bentonite clay, of which the usually characteristic mineral is montmorillonite, is essentially a hydrated aluminosilicate and has the composition:

$$Al_2O_3 \cdot 4SiO_2 \cdot H_2O + xH_2O$$

Many clays which contain montmorillonite type minerals have been termed bentonite. These clays have a definite microcrystalline structure in which magnesium, aluminum and silicon form a part of the crystal lattice, and in the interplanar areas between the lattices—in addition to a variable amount of water—there are present alkali metals such as calcium, magnesium, etc., which are associated with the lattice in an ionic or base exchange relationship. X-ray analyses have established the structural similarities and it is now known that extensive substitution and replacements can take place within the lattice.

The process of activating bentonite clay generally involves the removal of detrital impurities such as the carbonates of magnesium, calcium and iron, as well as other impurities which are present in varying amounts; the base-exchange ions; the lattice water; a part of the lattice magnesium; a part of the lattice aluminum, and little if any of the lattice silicon. It appears that the catalytic activity of a bentonite clay is not greatly developed until the crystal lattice is affected.

The acid activation, or acid pre-treatment, is usually effected by, but not necessarily restricted to, known processes such as are employed in the manufacture of decolorizing clays. Normally, the acid treatment (cold) is carried out on the mineral montmorillonite (bentonite), in finely divided form while the mineral clay is suspended in water in the form of a slurry to which mineral acid such as hydrochloric or sulfuric acid is added or dilute mineral acid added directly to the finely divided mineral clay. In either case, the weight ratio of cold acid to dry mineral clay may vary from about 20 to 100% based on the anhydrous basis, but preferably the ratio is in the order of 30–40%. The mixture of the mineral clay and acid is heated to about 160 to 210° F. for a period of time ranging from 2 to 12 hours and thereafter water washed and filtered. Acid treatments of montmorillonite types of clay are described in United States Patents 1,397,113, 1,579,326, 1,642,871, 2,470,872, 2,472,489, 2,484,828, 2,553,239 and many others too numerous to mention, all of which are known to those skilled in the art. The acid treated clay, after drying in any known or desired manner, is then formed into aggregate masses such as by granulating, powdering, molding, extruding, and the like, and utilized as catalysts in the conversion of hydrocarbon oils and in alkylation of phenols with olefinic hydrocarbons.

Activation of natural mineral products including clays of the kaolin as well as those of the montmorillonite class with concentrated sulfuric acid is also known in which the raw clay is mixed with the acid followed by aging at elevated temperature to complete the sulfation reaction. The sulfated clay is then mixed with water to effect dissolution of the soluble sulfates. It has also been proposed to subject the sulfated clays to thermal decomposition at temperatures in excess of 1100° F. followed by acid solvent treatment to remove alumina and other acid components leaving a residue composed substantially of silica. In lieu of the acid solvent treatment, the sulfated clay may be subjected to treatment at elevated temperatures in the presence of reducing agents or organic hydroxy compounds miscible with sulfuric acid to effect decomposition of the metal sulfates and drive off the oxides of sulfur and other volatiles that may be present.

It is the principal object of the present invention to provide a new type of clay catalyst having unique activity in the cracking of hydrocarbon oils and in the alkylation of phenolic compounds.

Another object is to provide a process of preparing the said catalyst.

Other objects and advantages will become more clearly apparent from the following description.

I have discovered that raw clays of the silica-alumina type, i.e., bentonite, montmorillonite, synthetic absorbent composites of silica-alumina, fuller's earth and all of the other similar clays, commercially available under various brand names are readily, efficiently and economically transformed into active clay catalysts by treating the clay with a mineral acid in the presence of an organic liquid at ambient temperature up to 130° C. The resulting treated clay shows, by X-ray diffraction examination, a structural difference over the untreated clay. It was found that the basal spacings, defined as the distance between the lowest sheet in one layer and the equivalent sheet of the layer above, in the crystal lattice of the treated clay gave the largest and most ordered basal spacing. This was new and unexpeced, in that the surface area increased with increased basal spacing. The basal spacings, the shape of the diffraction maxima, as well as the optical emission spectrographic examinations will be dealt with hereinafter.

For the purpose of the present invention, I prefer to use any raw clay of the silica-alumina type, the analysis of which calculated on the volatile free basis, shows the following constituents:

| | Percent |
|---|---|
| Silica ($SiO_2$) | From 60–74.0 |
| Aluminum oxide ($Al_2O_3$) | From 12–22 |
| Ferric oxide ($Fe_2O_3$) | From 1.5–5.0 |
| Magnesium oxide (MgO) | From 1.0–7.0 |
| Calcium oxide (CaO) | From 0.25–3.0 |

Raw clays which conform to the foregoing analysis are commercially available and are obtained under several brand names such as, for example, Pikes Peak (montmorillonite clay), sub-bentonite from Cheto Mine in Arizona, Wyo-Ben from Wyoming Bentonite, Aquagel from Baroid Div. of Nat. Lead, Volclay from American Colloid Co., Panther Creek Bentonite from American Colloid Co., etc.

Suitable organic compounds which are used as mediums, inert solvent-diluents, to produce active catalysts include aliphatic hydrocarbons, aromatic hydrocarbons, hydrogenated hydrogenated hydrocarbons, terpene hydrocarbons, halogenated hydrocarbons, alcohols, aldehydes, acids, esters, ketones, ethers, acetals, nitrated hydrocarbons and mixtures of the same. The organic compounds which are unsuitable are those which interfere with the effect of the acid on the raw clay. For all practical purposes the compound should be a liquid at the activating temperature. The compound can be a solid at room temperatures, but its melting point should be within the activating temperature range. For example, docosenol, a twenty-two carbon atom alcohol, has a melting point of 70.8° C. In using this alcohol, one would first melt it and then perform the various steps of the activation at temperatures exceeding 71° C.

The ratio of acids to clay may vary from 4 parts acid or acid mixture per 100 parts clay to 20 parts acid or acid mixture per 100 parts of clay.

The new type of clay catalyst is prepared by adding to 1 part by weight of the raw clay, which is usually in powdered form, from 1 to 5 parts by weight of an organic compound in liquid form in any suitable container. The mixture is stirred or agitated in any conventional manner at atmospheric, sub-atmospheric, or super-atmospheric pressures, and the resulting slurry or suspension is acidified with from 4 to 20 parts by weight per 100 parts by weight of the raw clay of a mineral acid such as hydrochloric, sulfuric, phosphoric, nitric, or mixtures thereof, or with a strong acid such as, for example, trichloroacetic, dichloroacetic, tribromoacetic, trifluoroacetic, triiodoacetic, diiodoacetic, benzenesulfonic, xylenedisulfonic, etc.

The weight ratio of the mineral acid, mixtures thereof, or any of the aforementioned strong based on anhydrous basis to the raw clay ranges from 4 parts to 20 parts by weight per 100 parts by weight of the raw clay. The acid mixture based on anhydrous basis may range from 1 to 10 parts by weight of sulfuric acid and from 10 to 1 part by weight of either hydrochloric acid, phosphoric acid, nitric acid, etc. The mineral acid or strong organic acids employed per se should not be too dilute. In other words, the concentration of such acids should preferably be between 40–95%. Anhydrous mineral acids such as 100% sulfuric acid can be effectively employed but are not quite as effective as acids of lower concentration.

After the slurry or suspension of the raw clay has been acidified, the resulting acid mixture is then heated at a temperature ranging from ambient to 130° C. with either periodic or constant agitation for a period of time ranging from one-half hour to about a maximum of ten hours. The actual time required to complete the activation will depend upon the nature or character of the organic compound employed as the inert solvent-diluent. For example, if such organic compound is a lower aliphatic alcohol or a low-boiling aliphatic ketone, low-boiling ester, low-boiling chlorinated hydrocarbon, etc., the acid activation reaction takes place at lower temperatures with a shorter period of contact time. The actual temperature employed in many instances is preferably the reflux temperature of the acidified slurry or suspension.

As examples of the organic compounds which are employed as the inert solvent-diluents to form the slurry or suspension of the raw clay for the acidification reaction, the following are illustrative:

ALIPHATIC HYDROCARBONS OF FROM 1 TO 22 CARBON ATOMS

Methane
Propane
Hexane
Heptane
Octane
Nonane
Decane
Dodecane
Octadecane
Eicosane
Docosane
3-ethylpentane 2,2-dimethylbutane
2,3-dimethylbutane
2-methylpentane
3-methylpentane
2,2-dimethylpentane
3,3-dimethylpentane
2,4-dimethylpentane
2-methylhexane
3-methylhexane
2,5-dimethylhexane
2-methylheptane

CYCLIC ALIPHATIC HYDROCARBONS OF FROM 3 TO 24 CARBON ATOMS

Cyclopropane
Cyclohexane
Methylcyclopentane
Ethycyclobutane
1-ethyl-2-methylcyclopropane
1,1,2-trimethylcyclopropane
1,2,3-trimethylcyclopropane
Cycloheptane
Methycyclohexane (Hexahydrotoluene)
1,1-dimethylcyclopentane
1,2-dimethylcyclopentane
1,3-dimethylcyclopentane
Cyclooctane
Nonylcylohexane
Dodecylcyclohexane
Octadecylcyclohexane
1,2-dimethylcyclohexane (hexahydro-o-xylene)
1,3-dimethylcyclohexane (hexahydro-m-xylene)
1,4-dimethylcyclohexane (hexahydro-p-xylene)
ethylcyclohexane (hexahydroethylbenzene)
ethylmethylcyclopentane
1,1,2-trimethylcyclopentane
Cyclononane
Propylcyclohexane (hexahydropropylbenzene)
1,2,4-trimethylcyclohexane (hexahydropseudocumene)
1,3,5-trimethylcyclohexane (hexahydromesitylene)
1-isopropyl-4-methylcyclohexane (p-methane)
1,2,4,5-tetramethylcyclohexane (hexahydrodurene)

AROMATIC HYDROCARBONS OF THE BENZENE SERIES OF FROM 6 TO 12 CARBON ATOMS

Benzene
Toluene
o-Xylene
m-Xylene
p-Xylene
Ethylbenzene
1,2,3-trimethylbenzene (hemimellitent)
1,2,4-trimethylbenzene
1,3,5-trimethylbenzene (mesitylene)
Propylbenzene
Isopropylbenzene (cumene)
1,2-ethylmethylbenzene
1,3-ethylmethylbenzene
1,4-ethylmethylbenzene
1,2,3,4-tetramethylbenzene (prehnitene)
1,2,4,5-tetramethylbenzene (durene)
p-Isopropylmethylbenzene (cymene)
1,4-methylpropylbenzene
Secondary butylbenzene
Tertiary butylbenzene
p-Diethylbenzene
Tertiary amylbenzene

HALOGENATED HYDROCARBONS OF FROM 1 TO 16 CARBON ATOMS

Chloroform
1,1-dichloroethane
1,2-dichloroethane
1,1,1-trichloroethane
1,1,2-trichloroethane
1,1,1,2-tetrachloroethane
1-iodooctane
Trichlorotrifluoroethane
Cetyl bromide
1,1,2,2-tetrachloroethane

HALOGENATED HYDROCARBONS OF FROM 1 TO 16 CARBON ATOMS—Continued

Pentachloroethane
Butylchloride
Amylchloride
Hexylchloride
Iso-decylchloride
Lauryl bromide
Chlorobenzene
Bromobenzene

ALIPHATIC ALCOHOLS OF FROM 1 TO 22 CARBON ATOMS

Methyl alcohol
Ethyl alcohol
Propyl alcohol
Isopropyl alcohol
n-Butyl alcohol
Sec.-butyl alcohol
Tert.-butyl alcohol
Isobutyl alcohol
n-Amyl alcohol
Isoamyl alcohol
2-pentanol
3-pentanol
Citronellol
Octadecyl alcohol
d-Amyl alcohol
2-methyl-2-butanol (amylene hydrate)
1-hexanol
2-hexanol
2-methyl-1-pentanol
3,3-dimethyl-2-butanol
2,3-dimethyl-2-butanol
1-heptanol
1-octanol
1-nonanol
1-decanol
Cetyl alcohol
Docosenol
Cinnamyl alcohol

ALIPHATIC AND AROMATIC KETONES

Acetone
Methylethyl ketone
Diethyl ketone
Methylpropyl ketone
Isopropylmethyl ketone
Tert.-butylmethyl ketone (pinacolin)
Acetyl acetone
Acetonyl acetone
Benzylphenyl ketone
Acetyl trimethylene
Cyclobutanone
Cyclopentanone
Cyclohexanone
Diamyl ketone
Acetophenone
Ethylphenyl ketone
Benzylmethyl ketone
Benzophenone
Dinonyl ketone

ALIPHATIC AND AROMATIC ETHERS

Ethylpropyl ether
n-Propylether
n-Butylmethyl ether
Isoamyl ether
Acetalmethylal
Isopropyl ether
Ethyl phenyl ether
Phenetole
n-Butyl phenyl ether
Methyl Cellosolve
Butyl Cellosolve

ALIPHATIC AND AROMATIC ETHERS—Continued

Methyl isobutyl ether
Diisoamyl ether
Dioxane
Anisole
Phenyl octyl ether
Veratrole
$\beta,\beta'$-Dichlorodiethyl ether, etc.

Aliphatic esters such as methyl, ethyl, propyl, butyl, isopropyl and isobutyl acetates and propionates, butyl oxalate, methyl myristate, octadecyl acetate, eicosyl acetate, triethylorthoformate, etc., including aliphatic esters of alkyl alcohols of from 1 to 20 carbon atoms with other saturated or unsaturated organic monocarboxylic acids such as for example:

| | |
|---|---|
| Formic acid | Acrylic acid |
| Caprylic | Acetic acid |
| Propionic acid | Chloroacetic acid |
| Capric acid | Butyric acid |
| Oxalic acid | Propionic acid |

Undecylic acid

Aromatic alcohols of from 7 to 19 carbon atoms, such as, for example:

| | |
|---|---|
| Benzyl alcohol | 3-methyl-1-phenyl butanol |
| 2,4-xylenol | Ethyl phenyl carbinol |
| Phenethyl alcohol | Methyl phenyl carbinol |
| Dodecylbenzyl alcohol | Butyl phenyl carbinol |

Carboylic acids of from 1 to 20 carbon atoms, such as, for example:

| | |
|---|---|
| Formic acid | Undecylic acid |
| Acetic acid | Oleic acid |
| Propionic acid | Stearic acid |
| Pentanoic acid | Palmitic acid |

Eicosanoic acid

ALIPHATIC AND AROMATIC ALDEHYDES OF FROM 1 TO 18 CARBON ATOMS

| | |
|---|---|
| Formaldehyde | Stearaldehyde |
| Acetaldehyde | Cyclohexanecarboxaldehyde |
| Hendecanal | Benzaldehyde |
| Tetradecyl aldehyde | p-Tolualdehyde |
| Nonyl aldehyde | 2-nitrobenzaldehyde |

AROMATIC ESTERS OF FROM 8 TO 23 CARBON ATOMS

| | |
|---|---|
| Benzyl formate | Cetyl benzoate |
| Beta naphthyl acetate | Hexyl benzoate | may be employed as such or mixtures thereof.

The folowing examples will illustrate the preparation of the activated clay catalyst by the new non-aqueous method of the present invention and the applicability of such catlysts in alkylation anl polymerization reactions. All parts given are by weight.

EXAMPLE I

A 2-liter 3-necked flask equiped with agitator, thermometer, and water-cooled reflux condenser was charged with 200 parts of No. 49 bentonite clay 200 mesh, source Whittaker, Clark, and Daniels, 1000 parts of ethyl acetate, and 27 parts of 78% sulfuric acid. The mixture was heated at 77° C. for 3 hours. It was then filtered through a No. 3 filter paper on a Buchner funnel. The filter cake was removed and dried in an air dryer at 60° C. for 12 hours. The dried catalyst was hammermilled and stored in an air tight container.

The raw untreated bentonite clay and the same clay treated as in Example I, together with an acid activated clay catalyst available commercially under the brand name of KSF obtained from the Girdler Catalyst Division of Chemetron Corp., were subjected to X-ray diffraction studies. These studies were carried out with a Philips X-ray diffractometer, using nickel filtered copper X-radiation at 40 kv., 35 ma. The detector was a proportional counter. Pulse height discrimination was employed. The samples were found and sieved at 325 mesh and prepared using standard crystallographic procedures.

The basal spacings, intensity and shape of the diffraction maxima are tabulated below. The intensities are in arbitrary units. All basal spacings are reported with an accuracy of plus or minus 0.05 Angstrom units.

| Sample | Basal spacing (A.) | Intensity | Shape of diffraction maximum |
| --- | --- | --- | --- |
| Raw clay of Example I | 11.18(±0.05) | 32 | Broad. |
| Treated clay of Example I | 12.97(±0.05) | 60 | Sharp. |
| KSF clay catalyst | 11.32(±0.05) | 40 | Broad. |

A.=Angstrom, which equals $10^{-8}$ cm.

From the foregoing analysis, it is clearly evident that the reflections from the raw clay of Example I and the commercially available acid activated KSF clay catalyst are broad, thus indicating a lack of complete order in the basal spacings. The treated clay of Example I, however, shows a much sharper and larger basal reflection, thus indicating that the treatment in accordance with the present invention increased the order in the basal spacings.

The treated clay catalyst of Example I was employed in the following alkylation and polymerization reactions:

*Alkylation A*

A 4-liter laboratory autoclave equipped with agitator, and thermometer, was charged with 188 parts of phenol (2.0 M) and 50 parts of catalyst of Example I. Into this this mixture at 150° C. 224 parts of butene (4.0 M) were added over a period of 2 hours at 33 p.s.i. gauge.

The catalyst was removed by filtration. 200 parts of the filtrate was distilled at 15 mm. pressure through a laboratory Vigreaux column to yield 140.5 parts of dibutylphenol distilling over the range 60° C. to 160° C. at 15 mm. and having a hydroxyl number of 260. The yield was 70.3%.

*Alkylation B*

A 1-liter-4-necked flask equipped with agitator, thermometer, dropping funnel and water-cooled reflux condenser was charged with 270 parts of p-cresol (2.5 M) and 27 parts of catalyst of Example I. Into this mixture at 80° C. 224 parts of diisobutylene (2.0 M) were added over a period of ½ hour.

The mixture was heated at 90° C. with agitation for a period of 3 hours. The catalyst was removed by filtration. 300 parts of the filtrate yielded 271.8 parts of octylcresol. Yield: 90.6%.

*Polymerization*

400 parts of an isobutylene dimer (commercial octene) were refluxed with 50 parts of the catalyst of Example I for a period of four hours. The following changes, indicative of polymerization, were noted:

|  | Initial | Final |
| --- | --- | --- |
| Viscosity (cps.) | 0.8068 | 3.165 |
| Iodine No. | 246.8 | 197.6 |
| Refractive index ($n_D^{25}$) | 1.4088 | 1.4415 |
| Boiling point (° C.) | 102 | 114.5 |

EXAMPLE II

A 2-liter 3-necked flask equipped with agitator, thermometer and water-cooled reflux condenser was charged with 300 parts of commercial bentonite (Aquagel), source Baroid Div., National Lead, 800 parts of acetone, 50 parts of 50% sulfuric acid and 15 parts of 30% hydrochloric acid. The mixture was heated at 58° C. for 3 hours. It was then filtered through No. 3 filter paper on a Buchner funnel. The filter cake was removed and dried in the atmosphere at room temperatures for 24 hours. The dried catalyst was hammer milled, and stored in an air tight container.

*Alkylation A*

A 1-liter 4-necked flask equipped with agitator, thermometer and water cooled reflux condenser was charged with 235 parts of phenol, USP (2.5 M), 252 parts of nonene (2.0 M), and 5 parts of catalyst of Example II. The mixture was heated at 90° C. with agitation for a period of 3 hours. The catalyst was removed by filtration. 400 parts of the filtrate were fractionated at 10 mm. pressure through a laboratory Vigreux column providing 17 theoretical plates to yield 344.3 parts of nonylphenol distilling over the range 155° C. to 181° C. at 10 mm. and having refractive index $N_D^{25}=1.5110$. Yield: 95.5%.

*Alkylation B*

A 1-liter 4-necked flask equipped with agitator, thermometer, dropping funnel and water-cooled reflux condenser was charged with 117.5 parts of phenol, USP (1.25 M), and 4 parts of catalyst of Example II. Into this mixture at 50° C. 168 parts of dodecene (1.0 M) were added over a period of 1.0 hour. The mixture was then heated at 60° C. with agitation for a period of 4 hours. The catalyst was removed by filtration. 200 parts of the filtrate were fractionated at 10 mm. pressure through a laboratory Vigreux column providing 17 theoretical plates to yield 143.8 parts of dodecylphenol distilling over the range 178° C. to 220° C. at 10 mm. and having refractive index $N_D^{25}=1.5070$. Yield: 78.3%.

EXAMPLE III

A 2-liter 3-necked flask equipped with agitator, thermometer, and water cooled reflux condenser was charged with 300 parts of No. 49 Volclay bentonite, source Whittaker, Clark and Daniels, 1000 parts of formic acid C.P. (88%) and 60 parts of 80% sulfuric acid. The mixture was heated at 80° C. for 3 hours. It was then filtered through a No. 3 filter paper on a Buchner funnel. The filter cake was removed and dried in the atmosphere for 24 hours. The dried catalyst was hammer milled and stored in an air tight container.

*Alkylation A*

A 1-liter 4-necked flask equipped with agitator, thermometer, dropping funnel and water-cooled reflux condenser was charged with 324 parts of cresol (3.0 M) and 10 parts of catalyst of Example III. Into this mixture at 85° C. 168 gms. dodecene (1.0 M) was added over a period of 2 hours. The mixture was heated at 85° C. with agitation for a period of 2 hours. The catalyst was removed by filtration. 400.0 gms. of the filtrate was fractionated at 10 mm. pressure through a laboratory Vigreux column providing 17 theoretical plates to yield 209.0 gms. dodecylcresol distilling over the range 205° C. to 220° C. at 10 mm. and having refractive index $N_D^{25}=1.5095$. Yield: 93.1%.

*Alkylation B*

A 1-liter 4-necked flask equipped with agitator, thermometer and water-cooled reflux condenser was charged with 188 parts of phenol, USP (2.0 M), 126 parts of 2-nonene (1.0 M), and 4 parts of catalyst of Example III. The mixture was heated at 70° C. with agitation for a period of 4 hours. The catalyst was removed by filtration. The filtrate was fractionated at 10 mm. pressure through a laboratory Vigreux column providing 17 theoretical plates to yield 207.5 parts of methyl octylphenol distilling over the range 162° C. to 187° C. at 10 mm. and having refractive index $N_D^{25}=1.5032$. Yield: 94.3%.

EXAMPLE IV

A 2-liter 3-necked flask equipped with agitator, thermometer and water cooled reflux condenser was charged with 500 parts of Wyoming bentonite, source Wyo-Ben Co., 2000 parts of methanol and 100 parts of 85% phosphoric acid. The mixture was heated at 65° C. for 4 hours. It was then centrifuged at 300 r.p.m. The cake was removed and dried in vacuum dryer at 50° C. for 6 hours at 25 lbs. vacuum. The dried catalyst was hammer milled and stored in an air tight container.

The X-ray data for this sample and its source clay are as follows:

| Sample | Basal spacing, A. | Intensity | Shape of diffraction maximum |
| --- | --- | --- | --- |
| Clay catalyst of Example IV | 12.56 | 74 | Sharp. |
| Raw clay (Wyoming bentonite) | 11.32 | 39 | Broad. |

*Alkylation A*

A 1-liter 4-necked flask equipped with agitator, thermometer, and water-cooled reflux condenser was charged with 252 parts of nonene (2.0 M), 235 parts of phenol, USP (2.5 M), and 60 parts of catalyst of Example IV. The mixture was heated at 95° C. with agitation for a period of 5 hours. The catalyst was removed by filtration. 350 parts of the filtrate was fractionated at 10 mm. pressure through a laboratory Vigreux column providing 17 theoretical plates to yield 286.9 parts of nonylphenol distilling over the range 155° C. to 181° C. at 10 mm. and having refractive index $N_D^{25}=1.5110$. Yield: 90.7%.

*Alkylation B*

A 1-liter 4-necked flask equipped with agitator, thermometer, dropping funnel and water-cooled reflux condenser was charged with 270 parts of cresol (2.5 M) and 70 parts of catalyst of Example IV. Into this mixture at 85° C. 252 parts of nonene (2.0 M) were added over a period of ½ hour. The resulting mixture was heated at 90° C. with agitation for a period of 3 hours. The catalyst was removed by filtration. 400 parts of the filtrate was distilled at 10 mm. pressure to yield 344.1 parts of nonylcresol. Yield: 95.8%.

EXAMPLE V

A 2-liter 3-necked flask equipped with agitator, thermometer and water-cooled reflux condenser was charged with 300 parts of Zeogel (fuller's earth), source Baroid Div., National Lead Co., 700 parts of chloroform and 45 parts of 70% nitric acid. The mixture was heated at 55° C. for 3 hours. It was then filtered through a No. 3 filter paper on a Buchner funnel. The filter cake was removed and dried in the atmosphere at room temperature for 6 hours. The dried catalyst was hammermilled and stored in an air tight container.

*Alkylation A*

A 1-liter 4-necked flask equipped with agitator, thermometer and water-cooled reflux condenser was charged with 252 parts of nonene (2.0 M), 235 parts of phenol (2.5 M) and 70 parts of catalyst of Example V. The mixture was heated at 95° C. with agitation for a period of 5 hours. The catalyst was removed by filtration. 350 parts of the filtrate was fractionated at 10 mm. pressure through a laboratory Vigreux column providing 17 theoretical plates to yield 293.5 parts of nonylphenol distilling over the range 155° C. to 181° C. at 10 mm. and having refractive index $N_D^{25}=1.5110$. Yield: 92.8%.

*Alkylation B*

A 1-liter 4-necked flask equipped with agitator, thermometer, and water-cooled reflux condenser was charged with 188 parts of phenol (2.0 M), 168 parts of dipropylene (2.0 M), and 50 parts of catalyst of Example V. The mixture was heated at 95° C. with agitation for a period of 5 hours. The catalyst was removed by filtration. 210 parts of the filtrate was fractionated at 10 mm. pressure through a laboratory Vigreux column providing 17 theoretical plates to yield 189.4 parts of hexylphenol distilling over the range 138° C. to 147° C. at 10 mm. and having refractive index $N_D^{25}=1.5174$. Yield: 90.2%.

EXAMPLE VI

A 1-liter Werner-Pfleiderer equipped with thermometer was charged with 300 parts of premium 200 mesh bentonite, source National Lead Co., 250 parts of acetone and 10 parts of 78% sulfuric acid. The mixture was kneaded at 30° C. for 20 minutes. It was then removed and dried in the atmosphere at room temperatures for 24 hours. The dried catalyst was hammermilled and stored in an air-tight container.

The X-ray data obtained for this sample and its source clay are as follows:

| Sample | Basal spacing, A. | Intensity | Shape of diffraction maximum |
| --- | --- | --- | --- |
| Clay catalyst of Example VI | 12.44 | 40 | Sharp. |
| Raw clay (200 mesh bentonite) | 11.20 | 30 | Broad. |

*Alkylation A*

A 1-liter 4-necked flask equipped with agitator, thermometer, dropping funnel and water-cooled reflux condenser was charged with 188 parts of phenol (2.0 M) and 20 parts of catalyst of Example VI. Into this mixture at 135° C. 208 parts of styrene (2.0 M) was added over a period of 1 hour. The resulting mixture was heated at 140° C. with agitation for a period of ½ hour. The catalyst was removed by filtration. 300 parts of the filtrate yielded 255 parts of 1-phenyl, 1-para-hydroxyphenylethane. Yield: 85%.

*Alkylation B*

A 1-liter 4-necked flask equipped with agitator, thermometer, dropping funnel and water-cooled reflux condenser was charged with 78 parts of benzene (1.0 M) and 10 parts of catalyst of Example VI. Into this mixture at 80° C. 168 parts of dodecene (1.0 M) was added over a period of 1.5 hours. The resulting mixture was heated at 80° C. with agitation for a period of 3 hours. The catalyst was removed by filtration. 200 parts of the filtrate was distilled to give 80.5 parts of dodecylbenzene.

EXAMPLE VII

A 2-liter 3-necked flask equipped with agitator, thermometer and water-cooled reflux condenser was charged with 100 parts of No. 49 bentonite 200 mesh, source Whittaker, Clark and Daniels, 300 parts of heptadecanol and 9.5 parts of 78% sulfuric acid. The mixture was heated at 90° C. for 3 hours. It was then filtered through a No. 3 filter paper on a Buchner funnel. The filter cake was removed and dried in the atmoshpere at room temperatures for 24 hours. The dried catalyst was stored in an air-tight container.

*Alkylation A with simultaneous dehydration of the alcohol*

A 1-liter 4-necked flask equipped with agitator, thermometer, and water-cooled reflux condenser was charged with 200 parts of cyclohexanol (2.0 M), 188 parts of phenol USP (2.0 M), and 15 parts of catalyst of Example VII. The mixture was heated at 130° C. with agitation for a period of 1 hour. The catalyst was removed by filtration. 300 gms. of the filtrate was distilled to give 270 parts of cyclohexylphenol having M.P. of 133° C. Yield: 90%.

*Alkylation B*

A 1-liter 4-necked flask equipped with agitator, thermometer and water-cooled reflux condenser was charged with 164 parts of cyclohexene (2.0 M), 188 parts of phenol, USP (2.0 M), and 15 parts of catalyst of Example VII. The mixture was heated at 90° C. with agitation for a period of 2 hours. The catalyst was removed by filtration. 300 gms. of the filtrate was distilled to give 282 parts of cyclohexylphenol having M.P. of 133° C.

The following examples will demonstrate the superiority of catalyst made by the new non-aqueous method over the older and current types of activated clays prepared in aqueous systems. KSF, a commercially available catalyst, was chosen for comparison, although a laboratory produced catalyst made by one of the conventional aqueous methods would give similar results. The comparison was made of the relative ability of the KSF to produce nonylphenol, a typical industrial product used in the manufacture of surface active agents.

To further demonstrate the effectiveness of the new method of catalyst preparation in accordance with the present invention, KSF was re-activated by the new method as will be shown hereinafter. The fact that the KSF based catalyst did not quite approach the activity of catalyst made from unactivated clay suggests that the aqueous treatment is responsible for some sort of irreparable damage to the clay structure.

The relative amounts of catalyst used, the mole ratio of the reactants, the reaction time, and the order of mixing do not necessarily represent optimum conditions but are given solely as examples for comparison.

EXAMPLE VIII

A 2-liter 3-necked flask equipped with agitator, thermometer and water-cooled reflux condenser was charged with 600 parts of Aquagel (bentonite), source Baroid, National Lead Co., 1600 parts of acetone, 35 parts of 30% hydrochloric acid, and 140 parts of 50% sulfuric acid. The mixture was heated at 58° C. for 3 hours. It was then filtered through a No. 3 filter paper on a Buchner funnel. The filter cake was removed and dried in the atmosphere at room temperatures for 24 hours. The dried catalyst was hammer milled and stored in an air tight container.

Alkylation A

A 1-liter 4-necked flask equipped with agitator, thermometer, and water-cooled reflux condenser was charged with 252 parts of nonene (2.0 M), 235 parts of phenol (2.5 M) and 5 parts of catalyst of Example VIII. The mixture was heated at 90° C. with agitation for a period of 3 hours. The catalyst was removed by filtration. 400 parts of the filtrate was fractionated at 10 mm. pressure through a laboratory Vigreux column providing 17 theoretical plates to yield 315.8 parts of nonylphenol distilling over the range 159° C. to 181° C. at 10 mm. and having refractive index $N_D^{25}=1.5110$. Yield: 96.1%.

Alkylation B with commercially available catalyst KSF

A 1-liter 4-necked flask equipped with agitator, thermometer, and water-cooled reflux condenser was charged with 252 parts of nonene (2.0 M), 235 parts of phenol (2.5 M) and 5 parts of catalyst KSF obtained from Sud Chemie, Munich, Germany. The mixture was heated at 90° C. with agitation for a period of 3 hours. The catalyst was removed by filtration. 361.5 parts of the filtrate was fractionated at 10 mm. pressure through a laboratory Vigreux column providing 17 theoretical plates to yield 95.4 parts of nonylphenol distilling over the range 159° C. to 181° C. at 10 mm. and having refractive index $N_D^{25}=1.5110$. Yield: 29.2%.

EXAMPLE IX

A 2-liter 3-necked flask equipped with agitator, thermometer and water-cooled reflux condenser was charged with 600 parts of KSF clay catalyst (obtained from Sud Chemie, Munich, Germany), 1600 parts of acetone, 35 parts of 30% hydrochloric acid, and 140 parts of 50% sulfuric acid. The mixture was heated at 58° C. for 3 hours. It was then filtered through a No. 3 filter paper on a Buchner funnel. The filter cake was removed and dried in the atmosphere at room temperature for 24 hours. The dried catalyst was hammer milled and stored in an air tight container.

Alkylation A

A 1-liter 4-necked flask equipped with agitator, thermometer and water-cooled reflux condenser was charged with 252 parts of nonene (2.0 M), 235 parts of phenol (2.5 M) and 5 parts of catalyst of Example IX. The mixture was heated at 90° C. with agitation for a period of 3 hours. The catalyst was removed by filtration. 386.8 parts of the filtrate was fractionated at 10 mm. pressure through a laboratory Vigreux column providing 17 theoretical plates to yield 244.0 parts of nonylphenol distilling over the range 155° C. to 181° C. at 10 mm. and having refractive index $N_D^{25}=1.5100$. Yield: 77.0%.

The following example illustrates the conventional procedure for the activation of a clay catalyst.

EXAMPLE X

A 2-liter 3-necked flask equipped with agitator, thermometer and water-cooled reflux condenser was charged with 100 parts of Aquagel (bentonite), source Baroid, National Lead Co., and 1700 parts of water. The mixture was stirred for 24 hours. Then 17 parts of 78% sulfuric acid were added with agitation. The mixture was agitated for 2 hours, then filtered and dried in a low temperature oven at 90° C. The dried product was hammer milled and stored in an air tight container.

Alkylation A

A 1-liter 4-necked flask equiped with agitator, thermometer, and water-cooled reflux condenser was charged with 252 parts of nonene (2.0 M), 235 parts of phenol, and 5 parts of catalyst of Example X. The mixture was heated at 90° C. with agitation for a period of 3 hours. The catalyst was removed by filtration. 320 parts of the filtrate was fractionated at 10 mm. pressure through a laboratory Vigreux column providing 17 theoretical plates to yield 96.8 parts of nonylphenol distilling over the range 159° C. to 181° C. at 10 mm. and having refractive index $N_D^{25}=1.5110$. Yield: 33.5%.

The alkylations of Example VIII and IX were repeated using ten grams of catalyst in each case but applying no external heat. These repeat alkylations are designated as Example VIII, Alkylation A, KSF Alkylation A, Example IX, Alkylation A, and Conventionally made Catalyst Alkylation A. Temperature rise versus time in minutes was recorded as shown in the following Table I.

TABLE I

| Time in minutes | Example VIII Alkylation A, °C. | KSF Alkylation A, °C. | Example IX Alkylation A, °C. | Conventionally made Catalyst (Example X) Alkylation A, °C. |
|---|---|---|---|---|
| 0 | 40 | 40 | 40 | 40 |
| 5 | 47 | 40.5 | 45 | 41 |
| 10 | 52 | 41 | 50 | 42 |
| 15 | 56 | 41 | 54.5 | 43 |
| 20 | 64 | 41.5 | 58 | 44 |
| 25 | 71 | 42 | 61 | 44.5 |
| 30 | 76 | 42.5 | 62 | 45.5 |
| 35 | 80 | 42.5 | 62.5 | 46.5 |
| 40 | 82 | 43 | 62 | 46.5 |
| 45 | 83 | 43 | 61 | 46.5 |
| 50 | 82 | 43 | 59 | 46 |
| 55 | 80 | 43 | 57 | 44.5 |
| 60 | 78 | 42 | 53 | 43 |

At the end of one hour, each crude product was removed by filtration and then distilled. The results were as follows:

Alkylation: Yield (after 60 min.), percent
   Example 8, Alkylation A _____ 75.8
   Example 9, Alkylation A _____ 56.1
   KSF Alkylation A _____ 19.2
   Conventionally made Catalyst (Example X),
     Alkylation A _____ 22.5

The catalysts of the latter four examples, together with the commercially available catalyst KSF and the raw clays of Examples I and IV, were subjected to X-ray diffraction studies as in Example I. The following data was obtained:

| Sample | Basal spacing, A. | Intensity | Shape of diffraction maximum |
|---|---|---|---|
| Catalyst of Example VIII | 12.71 | 85 | Sharp. |
| Catalyst of Example IX | 12.27 | 51 | Do. |
| KSF | 11.32 | 11 | Broad. |
| Conventionally made catalyst of Example X | 11.86 | 19 | Do. |
| Aquagel (raw clay used in Examples I and IV) | 11.18 | 40 | Do. |

The foregoing data is consistant with the data obtained in Example I.

Relative alkylating ability, though readily observed by one who is experienced in using clay catalysts for alkylations, is somewhat difficult to express quantitatively.

In Table II the relative alkylating abilities of a catalyst made by the non-aqueous procedure of the present invention and a catalyst of the type now commercially available are compared by reacting nonene and phenol in a 1.00 to 1.25 mole ratio in the presence of the two catalysts respectively for one hour only and plotting the yield of nonylphenol obtained versus the relative amounts of catalyst used. Several alkylations have established the general accuracy of this table. As can be seen, only 1.5 parts of the catalyst of Example I per mole of nonene is required to obtain high, commercially practical yield, whereas in the case of KSF almost 30.0 parts per mole is required.

TABLE II

| Parts catalyst used per mole of nonene | Percent yield of nonylphenol after 1 hour only at 90° C.* | |
|---|---|---|
| | Catalyst of Example I | KSF |
| 1 | 96 | 8 |
| 2 | 97 | 20 |
| 3 | 97 | 30 |
| 4 | 97 | 37 |
| 5 | 97 | 44 |
| 10 | 97 | 68 |
| 15 | 97 | 82 |
| 20 | 97 | 89 |
| 25 | 97 | 94 |
| 30 | 97 | 97 |

*Molar ratio: 1.0 nonene/1.25 phenol.

It is to be noted that the nature or character of the organic compounds I employ as inert-diluents to form the slurry or suspension of the raw clay for the acidification reaction is immaterial so long as such compounds per se or in admixture are free from basic groups or substituents.

When the catalyst of Examples II, III, V, and VII were subjected to X-ray diffraction studies as in Example I, it was found that the shape of diffraction maximum in all cases was sharp and that the basal spacing (A) was 12.00, 12.38, 12.62, and 12.80 respectively.

EXAMPLE XI

Example II was repeated with the exception that 50 parts of 50% sulfuric acid and 15 parts of 30% hydrochloric acid were replaced by 60 parts of benzenesulfonic acid.

EXAMPLE XII

Example II was repeated with the exception that the 50 parts of 50% sulfuric acid and 15 parts of 30% hydrochloric acid were replaced by 35 parts of xylene-disulfonic acid.

EXAMPLE XIII

Example II was again repeated with the exception that 50 parts of 50% sulfuric acid and 15 parts of 30% hydrochloric acid were replaced by 40 parts of trichloroacetic acid.

The catalysts prepared in accordance with Examples XI to XIII inclusive gave substantially the same yields of nonylphenol when employed in the alkylation procedure A of Example II when substituted for 5 parts of the catalyst of Example II.

I claim:

1. An acidic clay catalyst of the silica-alumina type having activity in the alkylation of phenolic compounds and in the conversion of hydrocarbon oils obtained by treating 100 parts by weight of a raw clay of the silca-alumina type in the presence of 100 to 500 parts by weight of an inert organic compound free from basic substituents as a diluent and selected from the class consisting of alkyl and cycloalkyl hydrocarbons of from 3 to 22 carbon atoms, halogenated hydrocarbons of from 1 to 16 carbon atoms, alkyl monohydroxy alcohols of from 1 to 22 carbon atoms, carbocyclic monohydroxy alcohols of the benzene series of from 7 to 19 carbon atoms, carbocyclic hydrocarbons of the benzene series of from 6 to 12 carbon atoms, alkyl ketones of from 2 to 11 carbon atoms and carbocyclic ketones of the benzene series of from 8 to 14 carbon atoms, alkyl ethers of from 3 to 10 carbon atoms and carbocyclic ethers of the benzene series of from 8 to 14 carbon atoms, alkyl aldehydes of from 1 to 18 carbon atoms and carbocyclic aldehydes of the benzene series of from 8 to 14 carbon atoms, monocarboxylic fatty acids of from 1 to 20 carbon atoms, alkyl esters of alkyl monohydroxy alcohols of from 1 to 20 carbon atoms and monocarboxylic acids of from 1 to 11 carbon atoms, and esters of carbocyclic monohydroxy alcohols of the benzene series of from 6 to 12 carbon atoms and monocarboxylic acids of from 1 to 16 carbon atoms, and in the presence of 4–20 parts by weight of an acid selected from the class consisting of mineral acid, polyhaloacetic, benzenesulfonic, and xylene disulfonic acid at a temperature ranging from ambient to 130° C. for a period of time ranging from one-half to 10 hours, filtering the treated clay, recovering the filter cake and drying the same at a temperature ranging from room temperature to 90° C., said catalyst characterized by a basal spacing at $10^{-8}$ cm. of 12.00 to 12.80 and a sharp shape of diffraction maximum as determined by X-ray diffraction analysis with a Philips X-ray diffractometer employing nickel filtered copper X-radiation at 40 kv. and 35 ma.

2. The process of preparing an acidic clay catalyst of the silica-alumina type having activity in the alkylation of phenolic compounds and in the conversion of hydrocarbon oils which consists essentially of treating 100 parts by weight of a raw clay of the silica-alumina type with 4 to 20 parts by weight of an acid selected from the class consisting of mineral acid, polyhaloacetic, benzenesulfonic, and xylene disulfonic acids at a temperature ranging from ambient to 130° C. in the presence of 100 to 500 parts of an inert organic compound free from basic substituents as a diluent selected from the class consisting of alkyl and cycloalkyl hydrocarbons of from 3 to 22 carbon atoms, halogenated hydrocarbons of from 1 to 16 carbon atoms, alkyl monohydroxy alcohols of from 1 to 22 carbon atoms, carbocyclic monohydroxy alcohols of the benzene series of from 7 to 19 carbon atoms, carbocyclic hydrocarbons of the benzene series of from 6 to 12 carbon atoms, alkyl ketones of from 2 to 11 carbon atoms and carbocyclic ketones of the benzene series of from 8 to 14 carbon atoms, alkyl ethers of from 3 to 10 carbon atoms and carbocyclic ethers of the benzene series of from 8 to 14 carbon atoms, alkyl aldehydes of from 1 to 18 carbon atoms and carbocyclic aldehydes of the benzene series of from 8 to 14 carbon atoms, monocarboxylic fatty acids of from 1 to 20 carbon atoms, alkyl esters of alkyl monohydroxy alcohols of from 1 to 20 carbon atoms, and monocarboxylic of from 1 to 11 carbon atoms, and esters of carbocyclic monohydroxy alcohols of the benzene series of from 6 to 12 carbon atoms and monocarboxylic acids of from 1 to 16 carbon atoms, for a period of time ranging from one-half to 10 hours, filtering the treated clay, recovering the filter cake and drying the same at a temperature ranging from room temperature to 90° C.

3. The process according to claim 2 wherein the inert organic compound is ethyl acetate.

4. The process according to claim 2 wherein the inert organic compound is acetone.

5. The process according to claim 2 wherein the inert organic compound is methanol.

6. The process according to claim 2 wherein the inert organic compound is heptadecanol.

7. The process according to claim 2 wherein the inert organic compound is chloroform.

References Cited by the Examiner

UNITED STATES PATENTS

| | | | |
|---|---|---|---|
| 2,400,020 | 5/46 | Pierce et al. | 252—450 X |
| 2,934,504 | 4/60 | Talvenheimo | 252—450 |
| 2,988,519 | 6/61 | Robinson et al. | 252—450 |
| 3,078,518 | 2/63 | Robinson et al. | 252—450 |
| 3,148,159 | 9/64 | Hodgkiss | 252—450 |

MAURICE A. BRINDISI, *Primary Examiner.*